United States Patent [19]

Schilling et al.

[11] 4,450,011

[45] May 22, 1984

[54] CATIONIC BITUMINOUS EMULSIONS

[75] Inventors: Peter Schilling; Hans G. Schreuders, both of Charleston, S.C.

[73] Assignee: Westvaco Corporation, New York, N.Y.

[21] Appl. No.: 419,906

[22] Filed: Sep. 20, 1982

[51] Int. Cl.³ .............................................. C08L 95/00
[52] U.S. Cl. ................................ 106/269; 106/273 N; 106/274; 106/277; 106/278
[58] Field of Search ................... 106/273 N, 274, 277, 106/269, 278; 260/401

[56] References Cited

U.S. PATENT DOCUMENTS

| | | | |
|---|---|---|---|
| 1,674,523 | 6/1928 | Sadtler | 106/269 |
| 1,969,904 | 8/1934 | Sadtler | 106/269 |
| 2,329,086 | 9/1943 | Robinson et al. | 260/401 |
| 2,514,954 | 7/1950 | Johnson | 106/269 |
| 2,585,336 | 2/1952 | McCoy | 106/277 |
| 2,743,288 | 4/1956 | Rueggeberg et al. | 260/400 |
| 2,901,370 | 8/1959 | Kent | 106/269 |
| 3,097,174 | 7/1963 | Mertens | 252/311.5 |
| 3,220,953 | 11/1965 | Borgfeldt | 252/311.5 |
| 3,230,104 | 1/1966 | Falkenberg et al. | 106/277 |
| 3,445,258 | 5/1969 | Ferm et al. | 106/277 |
| 3,466,247 | 9/1969 | Ohtsuka et al. | 252/311.5 |
| 3,518,101 | 6/1970 | Gzemski et al. | 106/277 |
| 3,728,278 | 4/1973 | Tramelli | 252/311.5 |
| 3,738,852 | 6/1973 | Doi et al. | 106/277 |
| 3,764,359 | 10/1973 | Dybalski | 106/280 |
| 3,867,162 | 2/1975 | Elste, Jr. | 106/277 |
| 3,957,524 | 5/1976 | Doughty et al. | 106/277 |

FOREIGN PATENT DOCUMENTS 1278421  6/1972  United Kingdom .

OTHER PUBLICATIONS

Asphalts and Allied Substances, Abraham, J., 1948, p. 560, 5th Ed.–in two vol.–vol. 1.

*Primary Examiner*—Theodore Morris
*Attorney, Agent, or Firm*—Terry B. McDaniel; Richard L. Schmalz

[57] ABSTRACT

Reaction products of polyamines with sulfonated oleic acid or sulfonated tall oil fatty acids are disclosed which give emulsions capable of producing cationic medium set mixing grade asphalt emulsions, as well as rapid set asphalt emulsions. Solventless asphalts as well as asphalts containing up to 15% by volume of a hydrocarbon oil can be used for emulsification.

22 Claims, No Drawings

CATIONIC BITUMINOUS EMULSIONS

FIELD OF THE INVENTION

This invention relates to improved bituminous emulsions, specifically to cationic medium set mixing grade emulsions and to mixing-grade, quick setting and slow-setting cationic bituminous-aggregate paving slurry seal mixtures. More particularly, it relates to emulsifiers for solventless and solvent containing mixing grade, oil-in-water cationic bituminous emulsions, which emulsifiers are the reaction products of polyamines with certain sulfonated carboxylic acids.

DESCRIPTION OF THE PRIOR ART

In paving operations, three main practices are employed to achieve thorough mixing of bitumen and aggregate:

(1) mixing of free flowing heated asphalt (asphalt cement) with pre-dried aggregate;

(2) mixing pre-dried aggregate with asphalt diluted with a hydrocarbon solvent (cutback asphalt, cutter stock) at ambient temperatures; and (3) mixing aggregate with asphalt emulsions, e.g., oil-in-water emulsions, obtained by vigorous agitation of asphalt and water in the presence of an emulsifying agent.

Because of increasing cost in energy and hydrocarbon solvents and because of environmental concerns, the use of emulsified asphalt is increasing. Dependent on the emulsifier used to achieve an emulsion, anionic or cationic emulsions are obtained. In anionic emulsions, asphalt droplets are negatively charged; in cationic emulsions, the asphalt droplets bear positive charges and migrate to the cathode when an electric field is applied. Experience in the field has shown that cationic emulsions are easier to apply and obviate some of the disadvantages of anionic emulsions, such as unpredictable break and poor bonding of asphalt to the aggregate surface resulting in stripping. Due to the electrostatic attraction of positively charged asphalt droplets and negatively charged aggregate surfaces, cationic bituminous emulsions deposit more rapidly, and stronger bonds between bitumen and aggregate are obtained.

Generally, depending on the characteristics of the type of mixing and rate of break, cationic aqueous bituminous emulsions are classified as rapid setting (CRS), medium setting (CMS) and slow setting (CSS). The rate of set is determined by the type and the amount of emulsifier and the pH value of the cationic soap solution. In the case of rapid setting emulsions, mainly used for repair work of old wearing courses, the emulsion is applied on the existing surface and aggregate is spread on top, and after compaction, the road can be opened to traffic shortly after the application of the new coat (chip seal, etc.). Medium setting emulsions are mixed with aggregate prior to being used in road construction, and slow set emulsions can be mixed with aggregate and stored for a longer period of time without breaking on the aggregate surface.

Cationic emulsions are obtained by employing a variety of nitrogen containing organic compounds, such as fatty amines, fatty diamines, fatty triamines, fatty amidoamines, fatty imidazolines, fatty mono- and di-quaternary ammonium salts, and reaction products of all these compounds with ethylene oxide. The fatty radical of these compounds can have a chain length of $C_{12}$–$C_{22}$ and comprise a variety of chemical structures. The building blocks for the preparation of these amines can be obtained from a variety of sources, such as petroleum refinates, animal fats, vegetable and fish oils, and tall oil. Amidoamines suitable as emulsifiers are disclosed in U.S. Pat. No. 3,230,104 to Falkenberg and in U.S. Pat. No. 3,097,174 to Mertens. Combinations of fatty monoamines and triamines are disclosed in U.S. Pat. No. 3,738,852 to Doi; fatty diamines are disclosed in U.S. Pat. No. 3,728,278 to Tramelli and U.S. Pat. No. 3,518,101 to Gzemski; fatty quaternary and diquaternary salts and modifications thereof are disclosed in U.S. Pat. No. 3,220,953 to Borgfelt, U.S. Pat. No. 3,867,162 to Elste, U.S. Pat. No. 3,764,359 to Dybalski, U.S. Pat. No. 3,957,524 to Doughty and U.S. Pat. No. 3,466,247 to Ohtsuka, and fatty imidazolines are taught in U.S. Pat. No. 3,445,258 to Ferm.

Generally, cationic emulsions prepared with fatty amines, fatty diamines, fatty amidoamines, etc., are unstable when mixed with a variety of siliceous or calcareous aggregates. Rapid breaking on the aggregate surface is observed with an increase in stiffening. At this point, the mix becomes unworkable. To overcome this problem, it is common practice to use cutback asphalt instead of asphalt cement for medium set mixing grade asphalt emulsions. Although cutback emulsions prepared with these emulsifiers also break when mixed with the aggregate, the solvent (a hydrocarbon oil, such as naphtha, kerosene, diesel oil, etc.) decreases the viscosity of the asphalt and increases the workability of the aggregate-asphalt mix. After placement of the mixes, the solvent evaporates and the final stiff aggregate-asphalt matrix is obtained. Because of the dramatically increased cost of solvents in recent years and because of the effort to reduce pollution, suitable emulsifiers are sought for cationic mixing grade emulsions without using solvent. The use of tallow quaternary ammonium salts and tallow diquaternary diammonium salts for making emulsions suitable for slurry seal, a solventless application, is described in U.S. Pat. No. 3,764,359 to Dybalski, and the use of a quaternary amine obtained by reacting epichlorohydrin, trimethylamine and nonylphenol for solventless mixes is disclosed in U.S. Pat. No. 3,957,524 to Doughty.

Slurry seal emulsions are special cases of a solventless mixing grade emulsion. Conventionally, emulsion slurry seals are formulated from (1) mineral aggregate which is a fine stone aggregate and/or mineral filler and (2) about 15% to about 25% by weight thereof of a mixing-grade, slow-setting emulsion containing about 50% to about 75% by weight of bituminous residue (usually asphalt), with a further addition of about 10% to about 15% of water, based on the weight of the dry aggregate, to attain slurry consistency. Usually, difficult-to-coat, densely-graded aggregates, such as sand, pit-run, crusher-run, etc., are combined with bituminous emulsions to produce slurry seal compositions. These aggregates range in size from anything passing all through a sieve of No. 4, and even No. 10 mesh, with from 15% to 20% passing through as fine a mesh as 200 mesh (U.S. Standard).

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such admixture with aggregate, the aqueous emulsion form of the bituminous material has been generally preferred because it is less hazardous and more economical to use than molten or solvent solutions. Further, the aqueous emulsion form can be stored, transported and applied at much lower temperatures, obviating the necessity of heating equipment to maintain a bitumen-aggregate system in a workable or usable form. While these advances have been recognized, widespread acceptance has not be achieved due to disadvantages found in previous aqueous bituminous emulsions.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is mixed with the emulsions, the emulsions applied to the aggregate, or aggregate applied to emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example, from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-grained aggregate in slurry form such as in gun application or spreader box application. Therefore, since the slurry seal should mix well, pump well, lay down well, not stiffen while being applied, and, after setting, wear well under traffic, it is particularly desirable to be able to control the setting time of the slurry for various aggregates employed.

The general object of this invention is to provide versatile emulsifiers for solventless and solvent containing mixing grade, oil-in-water bituminous emulsions. Another object of this invention is to provide emulsifier formulations for mixing grade emulsions which give a variety of set times as expressed in percent initial washoff coating (the percent coat on the aggregate surface after one minute mixing and immediate immersion in water) and percent one hour washoff coating. A further object of this invention is to provide a series of new amidoamines, imidazolines prepared as the reaction product of sulfonated oleic acid or sulfonated tall oil fatty acids and polyamines, suitable as emulsifiers for cationic oil-in-water emulsions.

Accordingly, an object of this invention is to provide a novel mixture of aggregate and bituminous emulsion.

A further object is to provide a mixture of the above character which is workable.

Another object is to provide a mixture of cationic bituminous emulsion and aggregate whose setting time can be varied.

A particular object is to provide a bituminous emulsion, fine-grained aggregate slurry mixture which deposits at a fairly rapid rate after being applied to the surface to be treated, and is workable for a period of time long enough to enable application in slurry form.

SUMMARY OF THE INVENTION

It has been found that in contrast to amidoamines and imidazolines which are obtained by condensation of fatty acids, having a chain-length of $C_{12}$–$C_{22}$, with polyethylene amines, such as diethylene triamine, which give cationic rapid set emulsions, reaction products of polyamines with sulfonated oleic acid or sulfonated tall oil fatty acids give emulsions capable of producing cationic medium set mixing grade asphalt emulsions, as well as rapid set asphalt emulsions. Solventless asphalts as well as asphalts containing up to 15% by volume of a hydrocarbon oil can be used for emulsification.

DESCRIPTION OF THE PREFERRED EMBODIMENTS

The sulfonated carboxylic acids used in the preparation of the invention cationic emulsifiers are derived by sulfonation of tall oil fatty acids and oleic acid of the following composition:

|  | Oleic Acid | Tall Oil Fatty Acid |
|---|---|---|
| Palmitic Acid | 4.29 | 2.37–5.70 |
| Palmitoleic Acid | 11.00 | 1.03–1.80 |
| Oleic Acid | 72.00 | 43.12–47.13 |
| Elaidic Acid | <1 | <1–23.50 |
| Linoleic Acid | 4.11 | 3.20–33.11 |
| Conjugated Linoleic Acid | 1.4 | 5.30–9.10 |

The sulfonated products are characterized by an acid number from about 220 to 330, saponification number from about 300 to 360.

Sauls and Ruggenberg disclose the sulfonation of oleic acid with sulfur trioxide in liquid sulfur dioxide in U.S. Pat. No. 2,743,288.

Pugh and Chesworth disclose in British Pat. No. 1,278,421 the sulfonation of oleic acid with gaseous sulfur trioxide diluted with an inert gas with a continuously formed liquid film of the unsaturated fatty acid.

The sulfonation of tall oil fatty acid is also disclosed in the above mentioned patents. Because of the complexity of the composition of tall oil fatty acids, no attempt to identify the sulfonated products was made.

Reaction mechanism and all aspects of sulfonation are reviewed in E. E. Gilbert, "Sulfonation and Related Reactions," R. E. Krieger Publishing Company, Huntington, N.Y., 1977.

The reaction products of these sulfonated fatty acids with polyamines, such as polyethylene amines or blend of suitable primary, secondary, tertiary amines and polyamines, give ammonium salts of sulfonated fatty acid amidoamines or, where applicable, imidazolines. The reaction products of sulfonated oils, fats, higher fatty acids and higher fatty acid esters with organic amines and amides are disclosed in U.S. Pat. No. 2,329,086 to Robinson and Webber for use as softeners for textile materials.

For example, when the major reaction product of sulfonated oleic acid is blended with two moles of diethylene triamine, the diammonium salt will be formed. Upon heating, one mole water is eliminated and the correspondent diethylene triammonium salt of the sulfonated oleic amidoamine is formed. Further heating gives the corresponding diethylene triammonium salt of the sulfonated imidazoline. All these compounds are amphoteric in nature, thus soluble in both acidic and alkaline media. Based on the higher acidity of the sulfonic acid group, metal salts, such as the potassium salt, or ammonium salts, such as the triethanol ammonium salt, can be formed by addition of one mole of potassium hydroxide in methanol or triethanolamine; and by heating with an additional mole of a polyamine, the corresponding amidoamine is obtained.

In the course of sulfonation of double bonds, $\beta$-sultone is considered as the primary sulfonation product. These sultones are very unstable and reactive. According to Gilbert, reaction with $SO_3$ gives a sulfate-sulfonic anhydride.

By reacting a $\beta$-sultone with an amine a ring opening reaction will occur forming a $\beta$-amino sulfonic acid ammonium salt The anhydride will react with an amine giving ammonium sulfate and $\beta$-hydroxy-sulfonic acid ammonium salt.

These amidoamines and imidazolines should serve as examples of the types of reaction products which one can expect. Since, however, the reaction products of sulfonation of oleic acid and especially tall oil fatty acid are complex, an even more complex mixture of reaction products will result from polyamine treatment.

The formation of imidazolines is limited to polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; N-aminoethyl propane diamine, N,N-diaminoethyl propane diamine and the N-aminoethyl or N,N-diaminoethyl substituted butane diamines, pentane diamines and hexane diamines, and N-hydroxy ethyl ethylene diamine. These compounds have the general formulae

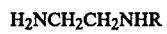

R=H—, CH$_3$—, C$_2$H$_5$—, C$_3$H$_7$—, —CH$_2$CH$_2$OH, —(CH$_2$CH$_2$NH)$_x$H
x=1, 2, 3, 4, . . . 10
or,

R$_1$=H—, CH$_3$—, C$_2$H$_5$—, C$_3$H$_7$—, NH$_2$CH$_2$CH$_2$—,
R$_2$=H—, CH$_3$—, C$_2$H$_5$—,
R$_3$=H—, CH$_3$—, C$_2$H$_5$—, C$_3$H$_7$—, NH$_2$CH$_2$CH$_2$—,
y=2, 3, 4, 5, 6.

Amines capable of forming amidoamines but not imidazolines are: 1,3-diaminopropane, 1,4-diaminobutane 1,5-diaminopentane, 1,6-diaminohexane, piperazine (1,4-diazacyclohexane), N-aminoethylpiperazine, N-hydroxyethyl piperazine, N-aminopropyl-propane diamine-1,3, N-methyl-N-aminopropylpropane diamine-1,3, N,N-dimethylpropane diamine-1,3, N,N-diethyl propane diamine-1,3, N,N-dimethyl-ethylene diamine, N,N-diethyl ethylenediamine; N-aminohexylhexane diamine-1,6.

Certain amidoamines or imidazolines with tertiary nitrogens, such as the reaction product of sulfonated oleic acid and N,N-dimethylpropane diamine-1,3 of the formula

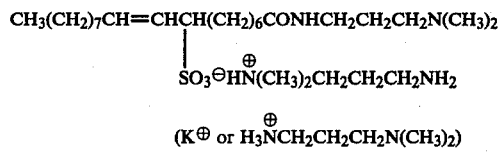

may be modified by further reaction with one or two moles of an alkylating agent such as methyl-, ethyl-, or benzyl halides, sulfates, phosphates, etc. The resulting compounds are classified as amphoteric quaternary ammonium salts. Their main characteristic is their solubility in aqueous systems without addition of acid, as is the case with amines, amidoamines, or imidazolines. An example of this type of quaternary ammonium salt as prepared by reacting methyl sulfate to provide the following structure:

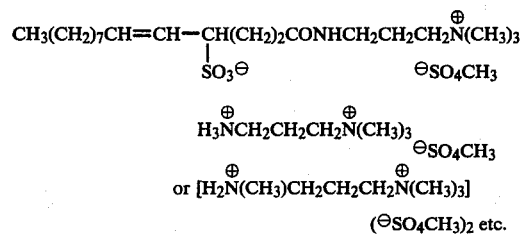

Further modifications of the above described mono-, di-, or polymeric amidoamines or imidazolines are the reaction products with reactive oxirane systems such as ethylene oxide, propylene oxide or butylene oxide. Reaction occurs preferentially on primary and secondary nitrogens, that is, a nitrogen to which one or two hydrogen atoms are covalently bound. The reaction products belong to the class of N-hydroxyethyl, N-2-hydroxypropyl- and N-2-hydroxy butyl amidoamines or imidazolines. If excess oxirane is reacted, polyethylene ether, polypropylene ether or polybutylene ether derivatives are obtained.

The examples which follow are illustrative of emulsifiers used to obtain cationic asphalt in water emulsions eminently useful for mixing under shear with a variety of siliceous and calcareous aggregates. After setting (evaporation of water), the asphalt films show excellent adhesion to the aggregate surface.

In preparing the bituminous emulsions of this invention, an aqueous acidic solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.2–2.0% by weight of the emulsion. Dependent on the emulsifier, a mixing grade emulsion is obtained in a pH range of 2–7, with the optimum performance at a pH of about 2.5.

The "bitumen" used in the emulsion can be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and D-946 may be emulsified with the aid of the emulsifiers of this invention.

The cationic soap solutions are normally obtained by suspending the amidoamine or imidazoline in water to which a sufficient amount of a suitable acid, for instance, hydrochloric, sulfuric, and phosphoric acid or the like is added until the desired pH value below 7 is reached and a clear emulsifier solution is obtained. Thereafter, the soap solution which is preheated to about 55° C. and the fluid asphalt which is preheated to 120°–125° C. are mixed under high shear in colloid mill for 30 seconds to give asphalt emulsions of brown color and creamy texture. Prior to testing according to ASTM D-244, the emulsions are stored at 70° C. for 16 hours. Aggregate mixing tests are performed by placing a weighed amount of aggregate in a mixing bowl, adding 5–10% by weight of the emulsion on top of the aggregate and mixing for one minute to five minutes. The mix is divided into three equal parts and placed in three dishes. The first sample is set aside; the second sample is washed with water immediately after mixing; and the third sample is washed with water after it was set aside for one hour. The percent coating of the aggregate surface is estimated visually. From the first sample, the percent initial coating, from the second sample, the percent initial washoff coating, and from the third sample, the percent one-hour washoff coating are obtained. The construction industry coating requirements are generally set at 90–95% minimum.

A typical cationic aqueous bituminous emulsion aggregate slurry is formulated in the laboratory with an amount of aggregate pre-wetted with water and admixed with a suitable cationic bituminous emulsion to a desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water inorganic and organic additives emulsion components, may be used. A typical unit is equipped with separate tanks for aggregate, water, emulsion and additives which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the cationic bituminous aggregate slurries of this invention.

The emulsifiers for the solventless emulsions of this invention perform very satisfactorily without auxiliary emulsifiers. However, occasionally it may be necessary to alter the performance of the emulsion to obtain improved viscosity at a given asphalt content or improved stability to dust and fines on the aggregate and to lengthen or shorten setting time, etc. In these cases, one of two methods can be employed. Either a mixture of tall oil fatty acids, preferably tall oil pitch, can be added to the bitumen (asphalt) prior to emulsification to improve break or improve the viscosity of the emulsion, or blends of the above described amidoamines and imidazolines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. This class of compounds generally decreases setting time. Others are fatty monoquaternary ammonium salts and fatty diquaternary diammonium salts and nonionic emulsifiers, such as ethylene glycol polyethers of nonyl- or dodecyl phenol. Combinations of amidoamines and imidazolines, based on fatty monocarboxylic acids of various sources and the sulfonated oleic acid or sulfonated tall oil fatty acids disclosed in this invention, can also be obtained by reacting suitable polyamines with a blend of fatty mono-, di- or tricarboxylic acids and sulfonated fatty acid. Carboxylic acids suitable for this purpose are tall oil fatty acids, crude tall oil, resin acids, resin acids reacted with fumaric or maleic acid, tall oil pitch, tallow fatty acids, soya fatty acids and the like. Kraft lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids."

Depending on the type of aggregate and its cleanliness, mixing is improved when aggregate is prewetted with 1–5% water by weight of the aggregate. The performance of the cationic asphalt emulsions in regard to mixing characteristics and setting (higher percentage of one-hour washoff coat) can, if necessary, also be improved when, based on the weight of asphalt, 1–15% of a solvent such as diesel oil is added to the asphalt prior to emulsification. The emulsions prepared with the sulfonated carboxylic acid-polyamine condensates disclosed in this invention are stable and can be stored for a long period of time until required for use. Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

In preparing the bituminous emulsions employed in the invention paving slurry seal mixtures, an aqueous acidic solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.2–2.0% by weight of the emulsion. Dependent on the emulsifier, a slurry grade emulsion is obtained in a pH range of 2–7, with the optimum performance at a pH of about 2.5.

The aggregates of the invention paving slurry seal mixtures are conventional difficult to coat, densely graded aggregates such as sand, pit-run, crusher-run, etc., which range in size from anything passing through a No. 4 sieve and at least 80% retained on 200 mesh (U.S. Standard Series).

Aggregate mixing tests are performed by mixing the aggregate with water and aqueous bituminous emulsion. An inorganic additive-mineral filler, such as portland cement, hydrated lime, limestone dust and fly ash, may be added to accelerate set/break time and salts, such as ammonium sulfate, aluminum sulfate and other inorganic sulfates, or surfactants may be added to retard the set/break of the slurry system. Mineral fillers shall comply with the requirements of ASTM D242. These materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel. If no brown stain is transferred to the paper towel, the slurry is considered to be "set." The cure time could also be measured with a cohesion testing device. Many other tests such as described in ASTM D3910 are used to measure strength and other physical properties of the slurry. The *Performance Guide for Slurry Seal* published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers.

For instance, the setting times can be controlled with the concentration of emulsifier, the addition of lime, cement or an inorganic additive, which would alter the break characteristics of the slurry system. An organic additivepolymer latex may also be employed to strengthen the matrix. The organic additive is preferably added to the emulsion-aggregate slurry.

A mixture of tall oil fatty acids, preferably tall oil pitch, can be added to the bitumen (asphalt) prior to emulsification to improve break or improve the viscosity of the emulsion. Alternatively, blends of the above described amidoamines and imidazolines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. Others are fatty monoquaternary ammonium salts and fatty diquaternary diammonium salts and nonionic emulsifiers, such as ethylene glycol polyethers of nonyl- or dodecyl phenol.

The cationic bituminous emulsions employed in the invention slurries are slow-setting, mixing grade slurries under ASTM D-2397; however, the set time may be shortened by adding lime or cement, providing an emulsion with quick-setting characteristics.

The practice of this invention may be seen in the following examples wherein the preparation of various types of the emulsifiers of the invention is described and wherein the advantages of using these compounds in a medium setting mixing grade cationic bituminous emulsion and slurry seal applications are illustrated.

EXAMPLE 1

This example illustrates the variety of emulsifiers which can be obtained from sulfonated oleic acid and polyamines under a variety of conditions.

Emulsifier 1 (Amidoamine type)

One hundred fifty grams sulfonated oleic acid was placed in a three-necked flask of suitable size (500 mL) equipped with stirrer, thermometer and Dean-Stark trap to collect distillate. One hundred grams diethylene triamine was added slowly under stirring the temperature rose to 100° C. The blend was heated to 210° C. When 18 mL distillate was collected, the reaction was terminated.

Emulsifier 2 (Imidazoline type)

One hundred fifty grams sulfonated oleic acid and 100 grams diethylene triamine were blended as described under Emulsifier 1. The reaction mixture was heated to 260° C. After 26 mL distillate was collected, the reaction was terminated.

Emulsifier 3

One hundred twenty grams sulfonated oleic acid and 100 grams aminoethylpiperazine were blended and heated to 240° C. After 12 mL distillate was collected the reaction was terminated.

Emulsifier 4

One hundred twenty grams sulfonated oleic acid and 100 grams triethylene tetramine were blended and heated to 230° C. After 10 mL distillate was collected, the reaction was terminated.

Emulsifier 5

One hundred grams sulfonated oleic acid and 100 grams tetraethylene pentamine were blended and heated to 240° C. After 10 mL distillate was collected, the reaction was terminated.

Emulsifier 6

One hundred thirty grams sulfonated oleic acid and 100 grams N-aminoethylethanolamine were blended and heated to 240° C. After 20 mL distillate was collected, the reaction was terminated.

Emulsifier 7

One hundred twenty grams sulfonated oleic acid was blended with 50 grams triethanolamine and 40 grams diethylene triamine. It was heated to 250° C. After 16 mL distillate was collected, the reaction was terminated.

Emulsifier 8

One hundred twenty grams sulfonted oleic acid was blended with 60 grams aminoethylpiperazine and 40 grams triethylene tetramine. It was heated to 240° C. After 15 mL distillate was collected, the reaction was terminated.

EXAMPLE 2

This example illustrates a variety of emulsifiers prepared from polyamines and blends of sulfonated oleic acid and fatty acids of various sources, Vinsol or kraft lignin.

Emulsifier 9 (Imidazoline)

One hundred grams sulfonated oleic acid and 100 grams 1483 were blended at room temperature. To the blend 100 grams diethylene triamine was added and the mixture heated to 265° C. After 46 mL distillate was collected, the reaction was terminated.

Emulsifier 10

One hundred five grams sulfonated oleic acid and 105 grams Rosin S were heated to 100° C. To this blend 85 grams diethylene triamine was added. The temperature rose to 150° C. It was further heated to 265° C. After 35 mL distillate was collected, the reaction was terminated.

Emulsifier 11

One hundred grams sulfonated oleic acid and 100 grams tall oil pitch were blended and 100 grams diethylene triamine added. It was heated to 240° C. After 30 mL distillate was collected, the reaction was terminated.

Emulsifier 12

One hundred grams sulfonated oleic acid and 50 grams Industrene D ® (manufactured by Humko, now Witco) were blended and 80 grams diethylene triamine added. It was heated to 210° C. After 13 mL distillate was collected, the reaction was terminated.

Emulsifier 13

One hundred grams sulfonated oleic acid and 100 grams $C_{21}$ dicarboxylic acid (Diacid ®, manufactured by Westvaco) were blended and 100 grams diethylene triamine added. It was heated to 190° C. After 14 mL distillate was collected, the reaction was terminated.

Emulsifier 14

One hundred thirty-five grams sulfonated oleic acid and 135 grams $C_{21}$ dicarboxylic acid (Diacid ®, manufactured by Westvaco) were blended and 120 grams DETA added. It was heated to 220° C. After 28 mL distillate was collected, the reaction was terminated.

Emulsifier 15

Ninety grams sulfonated oleic acid and 30 grams vinsol were blended and 80 grams diethylene triamine added. It was heated to 230° C. After 20 mL distillate was collected, the reaction was terminated.

Emulsifier 16

One hundred grams sulfonated oleic acid and 100 grams diethylene triamine were blended at room temperature. The temperature rose to 80° C. It was heated to 100° C. and 40 grams Indulin A (kraft lignin acidified to pH 2.5) was added. A few drops of octanol prevented excessive foaming. It was heated to 200° C. After 27 mL distillate was collected, it was cooled to 120° C. and diluted with methyl cellosolve/isopropanol.

Emulsifier 17

To 110 grams sulfonated oleic acid 13 grams potassium hydroxide in 80 mL methanol was added. The temperature rose to 65° C. After 10 minutes 50 grams diethylene triamine was added through a dropping funnel and the reaction mixture heated to 200° C. After 88 mL distillate was collected, the reaction was terminated. It was cooled to 110° C. and diluted with diethylene glycol/isopropanol.

Emulsifier 18

Ninety grams sulfonated oleic acid and 90 grams DIAM 11C (tallow propane diamine manufactured by General Mills Inc., now Henckel) were blended and 30 grams diethylene triamine added. The temperature rose to 100° C. It was further heated to 230° C. After 7 mL of distillate was collected, the reaction was terminated.

EXAMPLE 3

This example shows some emulsifiers prepared from sulfonated tall oil fatty acids and polyamines.

Emulsifier 19

One hundred fifty grams sulfonated tall oil fatty acid was mixed with 100 grams diethylene triamine and heated to 210° C. After 14 mL distillate was collected, the reaction was terminated.

Emulsifier 20

One hundred grams sulfonated tall oil fatty acid was mixed with 100 grams of a blend of aminoethylpiperazine and tetraethylene triamine and heated to 210° C. After 7 mL distillate was collected, the reaction was terminated.

Emulsifier 21

One hundred grams sulfonated tall oil fatty acid was mixed with 100 grams of a blend of aminoethylpiperazine and tetraethylene triamine and heated to 210° C. After 7 mL distillate was collected, the reaction was terminated.

EXAMPLE 4

This example illustrates the properties of emulsions obtained when the above described emulsifiers were used for emulsification. To show the versatility of these emulsions, various siliceous and calcareous aggregates were used for the mixing experiments. Emulsions were prepared with Venezuelan based asphalt, having a pentration value of 120-150. Excellent emulsions were obtained when 0.3-1.5% emulsifier dosage was used. Emulsions were prepared in the pH range from 1.5-6.5 with pH 2.5 being the optimum pH value. The pH adjustments were made with dilute hydrochloric acid. The test data are given in Table I. The aggregate test indicates whether an emulsion is suitable for mixing operations. It was carried out with mixing bowl and spoon. Depending on the cleanliness of the aggregate, it was prewetted with 1-3% water prior to addition of the emulsion. After a 5-9 grams emulsion (per 100 grams of aggregate) was mixed with aggregate for one-minute, initial coating, initial washoff coating, and one-hour washoff coating were determined visually. From these data, the mixing efficiency and set time with a specific aggregate can be determined.

TABLE I
EVALUATION OF ASPHALT EMULSIONS

| Emulsifier | % Dosage | % Asphalt Content | pH Value | Saybolt Furol Viscosity @ 50° C. (sec.) | Aggregate | % Water | % Initial Coating | Coating After Water Wash (min.) | | | |
|---|---|---|---|---|---|---|---|---|---|---|---|
| | | | | | | | | 1 | 15 | 30 | 60 |
| Emulsifier 1 | 0.4 | 68.2 | 2.5 | 37 | Schloss | 3 | broke | | | | |
| | | | | | Tennessee River Gravel | 3 | 100 | 5 | | 95 | 100 |
| | | | | | Tennessee Limestone | 2 | broke | | | | |
| | | | | | Rhyolite | 1 | 100 | 15 | | 80 | 100 |
| | 0.6 | 68.4 | 2.5 | 38 | Schloss | 3 | 100 | 100 | | | |
| | | | | | Tennessee River Gravel | 3 | 100 | 5 | | 95 | 100 |
| | | | | | Tennessee Limestone | 2 | 100 | 95 | | 100 | |
| | | | | | Good Hope | 4 | 100 | 30 | | 100 | |
| | | | | | Koch | 1 | 100 | 2 | | 20 | 40 |
| | 1.0 | 68.7 | 2.5 | 94 | Schloss | 3 | 100 | 10 | 60 | 80 | |
| | | | | | Tennessee River Gravel | 3 | 100 | 5 | | 85 | 95 |
| | | | | | Tennessee Limestone | 2 | 100 | 3 | | 85 | 100 |
| | | | | | Rhyolite | 1 | 100 | 5 | | 75 | 85 |
| Emulsifier 2 | 0.4 | 68.3 | 2.5 | 45 | Schloss | 3 | broke | | | | |
| | | | | | Tennessee River Gravel | 3 | 100 | 10 | | 100 | |
| | | | | | Tennessee Limestone | 2 | broke | | | | |
| | | | | | Rhyolite | 1 | 100 | 10 | | 90 | 100 |
| | 0.6 | 68.6 | 2.5 | 47 | Schloss | 3 | 100 | 100 | | | |
| | | | | | Tennessee River Gravel | 3 | 100 | 5 | | 100 | |
| | | | | | Tennessee Limestone | 2 | 100 | 15 | | 100 | |
| | | | | | Good Hope | 4 | 100 | 30 | | 100 | |
| | | | | | Koch | 1 | 100 | 2 | | 20 | 40 |
| | 1.0 | 69.0 | 2.5 | 132 | Schloss | 3 | 100 | 2 | 50 | 70 | 90 |
| | | | | | Tennessee River Gravel | 3 | 100 | 5 | | 90 | 100 |
| | | | | | Tennessee Limestone | 2 | 100 | 3 | | 80 | 90 |
| | | | | | Rhyolite | 1 | 100 | 5 | | 75 | 95 |
| Emulsifier 3 | 0.4 | 68.3 | 2.5 | 45 | Schloss | 3 | broke | | | | |
| | | | | | Tennessee River Gravel | 3 | 100 | 10 | | 100 | |
| | | | | | Tennessee Limestone | 2 | broke | | | | |
| | | | | | Rhyolite | 1 | 100 | 50 | | 100 | |
| | 0.6 | 68.4 | 2.5 | 49 | Schloss | 3 | 100 | 20 | 100 | | |
| | | | | | Tennessee River Gravel | 3 | 100 | 10 | | 100 | |
| | | | | | Tennessee Limestone | 2 | 100 | 50 | | 100 | |
| | | | | | Rhyolite | 1 | 100 | 10 | | 75 | 95 |
| | 1.0 | 68.0 | 2.5 | 70 | Schloss | 3 | 100 | 10 | 50 | 80 | |
| | | | | | Tennessee River Gravel | 3 | 100 | 5 | | 90 | 100 |
| | | | | | Tennessee Limestone | 2 | 100 | 3 | | 100 | |
| | | | | | Rhyolite | 1 | 100 | 5 | | 95 | 95 |
| Emulsifier 4 | 0.8 | 68.4 | 2.5 | 75 | Schloss | 3 | 100 | 3 | | 60 | 70 |
| | | | | | Tennessee River Gravel | 3 | 100 | 10 | | 85 | 100 |
| | | | | | Tennessee Limestone | 2 | 100 | 5 | | 80 | 95 |
| | | | | | Rhyolite | 1 | 100 | 5 | | 85 | 90 |
| Emulsifier 5 | 1.0 | 68.4 | 2.5 | 81 | Schloss | 3 | 100 | 10 | | 90 | 100 |
| | | | | | Tennessee River Gravel | 3 | 100 | 5 | | 75 | 80 |
| | | | | | Tennessee | 2 | 100 | 3 | | 80 | 90 |

TABLE I-continued

EVALUATION OF ASPHALT EMULSIONS

| Emulsifier | % Dosage | % Asphalt Content | pH Value | Saybolt Furol Viscosity @ 50° C. (sec.) | Aggregate | % Water | % Initial Coating | Coating After Water Wash (min.) | | | |
|---|---|---|---|---|---|---|---|---|---|---|---|
| | | | | | | | | 1 | 15 | 30 | 60 |
| | | | | | Limestone Licking Limestone | 3 | 100 | 30 | | 100 | |
| | | | | | Koch | 1 | 100 | 2 | | 15 | 30 |
| Emulsifier 6 | 0.8 | 68.1 | 2.5 | 67 | Schloss | 3 | 100 | 3 | | 60 | 70 |
| | | | | | Tennessee River Gravel | 3 | 100 | 5 | | 80 | 90 |
| | | | | | Tennessee Limestone | 2 | 100 | 5 | | 80 | 95 |
| | | | | | Rhyolite | 1 | 100 | 5 | | 70 | 80 |
| Emulsifier 7 | 1.0 | 68.0 | 2.5 | 34 | Schloss | 3 | 100 | 2 | 20 | 40 | 80 |
| | | | | | Tennessee River Gravel | 3 | 100 | 5 | | 80 | 90 |
| | | | | | Tennessee Limestone | 2 | 100 | 5 | | 50 | 60 |
| | | | | | Rhyolite | 1 | 100 | 5 | | 60 | 90 |
| Emulsifier 8 | 1.0 | 68.3 | 2.5 | 81 | Schloss | 3 | 100 | 2 | 50 | 80 | |
| | | | | | Tennessee River Gravel | 3 | 100 | 5 | | 50 | 95 |
| | | | | | Tennessee Limestone | 2 | 100 | 3 | | 70 | 95 |
| | | | | | Rhyolite | 1 | 100 | 5 | | 60 | 90 |
| Emulsifier 9 | 0.8 | 67.3 | 2.5 | 27 | Schloss | 3 | 100 | 10 | | 60 | 80 |
| | | | | | Tennessee River Gravel | 3 | 100 | 15 | | 95 | 100 |
| | | | | | Tennessee Limestone | 2 | 100 | 5 | | 80 | 95 |
| | | | | | Koch | 1 | 100 | 40 | | 60 | 65 |
| Emulsifier 10 | 1.0 | 68.3 | 2.5 | 67 | Schloss | 3 | 100 | 10 | 100 | | |
| | | | | | Tennessee River Gravel | 3 | 100 | 5 | | 80 | 90 |
| | | | | | Tennessee Limestone | 2 | 100 | 5 | | 100 | |
| | | | | | Rhyolite | 1 | 100 | 5 | | 60 | 90 |
| Emulsifier 11 | 1.0 | 68.1 | 2.5 | 60 | Schloss | 3 | 100 | 5 | | 50 | 70 |
| | | | | | Tennessee River Gravel | 3 | 100 | 5 | | 80 | 90 |
| | | | | | Tennessee Limestone | 2 | 100 | 7 | | 85 | 95 |
| | | | | | Licking Limestone | 3 | 100 | 7 | | 80 | 100 |
| | | | | | Koch | 1 | 100 | 2 | | 20 | 40 |
| Emulsifier 12 | 1.0 | 68.4 | 2.5 | 26 | Schloss | 3 | broke | | | | |
| | | | | | Tennessee River Gravel | 3 | 100 | 20 | | 80 | 100 |
| | | | | | Tennessee Limestone | 2 | 100 | 10 | | 40 | 70 |
| | | | | | Rhyolite | 1 | 100 | 10 | | 60 | 80 |
| Emulsifier 13 | 1.0 | 68.1 | 2.5 | 191 | Schloss | 3 | 100 | 10 | | 50 | 60 |
| | | | | | Tennessee River Gravel | 3 | 100 | 10 | | 80 | 95 |
| | | | | | Tennessee Limestone | 2 | 100 | 10 | | 70 | 80 |
| | | | | | Rhyolite | 1 | 100 | 5 | | 60 | 80 |
| Emulsifier 14 | 1.0 | 68.4 | 2.5 | 93 | Schloss | 3 | 100 | 2 | 30 | 40 | 80 |
| | | | | | Tennessee River Gravel | 3 | 100 | 20 | | 60 | 80 |
| | | | | | Tennessee Limestone | 2 | 100 | 5 | | 50 | 70 |
| | | | | | Rhyolite | 1 | 100 | 5 | | 60 | 70 |
| Emulsifier 15 | 1.0 | 68.4 | 2.5 | 115 | Schloss | 3 | 100 | 10 | | 100 | |
| | | | | | Tennessee River Gravel | 3 | 100 | 5 | | 75 | 80 |
| | | | | | Tennessee Limestone | 2 | 100 | 3 | | 80 | 90 |
| | | | | | Licking | 3 | 100 | 3 | | 80 | 100 |

TABLE I-continued

EVALUATION OF ASPHALT EMULSIONS

| Emulsifier | % Dosage | % Asphalt Content | pH Value | Saybolt Furol Viscosity @ 50° C. (sec.) | Aggregate | % Water | % Initial Coating | Coating After Water Wash (min.) 1 | 15 | 30 | 60 |
|---|---|---|---|---|---|---|---|---|---|---|---|
| Emulsifier 16 | 1.0 | 68.4 | 2.5 | 115 | Limestone Koch | 1 | 100 | 2 | | 15 | 30 |
| | | | | | Schloss | 3 | 100 | 5 | | 100 | |
| | | | | | Tennessee River Gravel | 3 | 100 | 10 | | 50 | 80 |
| | | | | | Tennessee Limestone | 2 | 100 | 5 | | 50 | 80 |
| | | | | | Rhyolite | 1 | 100 | 5 | | 50 | 90 |
| Emulsifier 17 | 0.8 | 67.1 | 2.5 | 42 | Schloss | 3 | 100 | 5 | | 50 | 70 |
| | | | | | Tennessee River Gravel | 3 | 100 | 7 | | 90 | 95 |
| | | | | | Tennessee Limestone | 2 | 100 | 10 | | 100 | |
| | | | | | Koch | 1 | 100 | 2 | | 20 | 30 |
| Emulsifier 18 | 0.8 | 69.0 | 2.5 | 54 | Schloss | 3 | 100 | 5 | 30 | 60 | 100 |
| | | | | | Tennessee River Gravel | 3 | 100 | 20 | | 80 | 100 |
| | | | | | Tennessee Limestone | 2 | 100 | 30 | | 90 | 100 |
| | | | | | Rhyolite | 1 | 100 | 30 | | 60 | 70 |

EXAMPLE 5

This example shows the effectiveness of these types of emulsifiers for slurry seal application.

Table II illustrates the quick set times of the slurries prepared in Examples 1–3, as well as the ability to control the set times with addition of a mineral filler (portland cement). The set times are shown in the following table.

TABLE 11

SLURRY SET TIMES (min.)

| Emulsifier | Without Cement | With Cement |
|---|---|---|
| Emulsifier 1 | 198 | 4 |
| Emulsifier 3 | 176 | 16 |
| Emulsifier 4 | 247 | 7 |
| Emulsifier 5 | 252 | 28 |
| Emulsifier 6 | 180 | 10 |
| Emulsifier 7 | 180+ | 35 |
| Emulsifier 8 | 120+ | 29 |
| Emulsifier 9 | broke | broke |
| Emulsifier 10 | 180+ | broke |
| Emulsifier 11 | broke | 5 |
| Emulsifier 13 | 180+ | 4 |
| Emulsifier 15 | 247 | 4 |
| Emulsifier 16 | 176 | 15 |
| Emulsifier 17 | 180+ | 9 |
| Emulsifier 19 | 120+ | 1 |
| Emulsifier 20 | 19 | 1 |
| Emulsifier 21 | broke | 27 |

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A cationic bituminous emulsion comprising from about 30% to about 80% by weight of bitumen, from about 0.1% to about 10% by weight of an emulsifier selected from the group consisting of reaction products of polyamines reacted with sulfonated carboxylic acids selected from the group consisting of sulfonated tall oil fatty acid and sulfonated oleic acid, and water to make up 100% by weight, the emulsion having a pH in the range of from 2–7.

2. The cationic bituminous emulsion of claim 1 wherein the emulsion is a mixing grade composition.

3. The cationic bituminous emulsion of claim 1 including up to 90% of the total emulsifier formulation of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

4. The cationic bituminous emulsion of claim 1 including up to 90% of the total emulsifier formulation of one or more auxiliary emulsifiers selected from the group consisting of nitrogen derivatives of resin acids and nitrogen derivatives of kraft lignin.

5. The cationic bituminous emulsion of claim 1 wherein the emulsifier formulation is prepared by reacting a polyamine with a blend of the sulfonated carboxylic acid of claim 1 and fatty carboxylic acids selected from the group consisting of fatty mono-, di- and tricarboxylic acids and mixtures thereof.

6. The cationic bituminous emulsion wherein the emulsifier formulation is prepared by reacting a polyamine with a blend of resin acids and a sulfonated carboxylic acid of claim 1.

7. The cationic bituminous emulsion wherein the emulsifier formulation is prepared by reacting a polyamine with a blend of kraft lignin and a sulfonated carboxylic acid of claim 1.

8. The cationic bituminous emulsion of claims 1, 2, 3, 4, 5, 6 or 7 comprising from about 60% to 70% bitumen by weight of the emulsion, from about 0.2% to 2.0% emulsifier by weight of the emulsion, and water to make up 100% by weight, the emulsion having a pH of about 2.7.

9. The cationic bituminous emulsion of claim 1 or 2 wherein the emulsion includes from 1% to 15% by volume of a hydrocarbon oil.

10. The cationic bituminous emulsion of claim 1 wherein a mixture of tall oil fatty acids is added to the bitumen prior to emulsification.

11. The cationic bituminous emulsion of claim 10 wherein the tall oil fatty acids mixture is tall oil pitch.

12. A paving slurry seal mixture of a cationic aqueous bituminous emulsion and mineral aggregate capable of being worked comprising: a densely graded mineral aggregate passing through No. 4 and at least 80% retained on 200 mesh screen; from about 8% to about 20% of an oil in water type emulsion, based on the weight of the mineral aggregate, wherein the emulsion is comprised of from about 55% to about 65% bitumen, based on the weight of the emulsion, from about 0.5% to about 2% of a cation-active emulsifier based on the weight of the emulsion, wherein the emulsifier is the reaction product of one or more polyamines reacted with a sulfonated carboxylic acid selected from the group consisting of sulfonated tall oil fatty acid and sulfonated oleic acid, and water to make up 100% by weight of the emulsion, the emulsion having a pH in the range of from 2—7; from about 4% to about 16% water, based on the weight of the mineral aggregate, added to form a slurry of the aggregate and the emulsion; and up to 3% of an inorganic or organic additive to reduce the setting time of the mixture.

13. The paving slurry seal mixture of claim 12 wherein the emulsion is a slow-setting, mixing grade composition.

14. The paving slurry seal mixture of claim 12 or 13 including up to 90% of the total emulsifier formulation of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

15. The paving slurry seal mixture of claim 12 or 13 including up to 90% of the total emulsifier formulation of one or more auxiliary emulsifiers selected from the group consisting of nitrogen derivatives of resin acids and nitrogen derivatives of kraft lignin.

16. The paving slurry seal mixture of claim 12 or 13 wherein the emulsifier formulation is prepared by reacting the polyamine with a blend of the sulfonated carboxylic acid of claim 1 and fatty carboxylic acids selected from the group consisting of fatty mono-, di- and tricarboxylic acids and mixtures thereof.

17. The paving slurry seal mixture of claim 12 or 13 wherein the emulsifier formulation is prepared by reacting the polyamines with a blend of resin acids and the sulfonated carboxylic acid.

18. The paving slurry seal mixture of claim 12 or 13 wherein the emulsifier formulation is prepared by reacting the polyamines with a blend of kraft lignin and the sulfonated carboxylic acid.

19. The paving slurry seal mixture of claim 12 or 13 comprising from about 55% to 65% bitumen by weight of the emulsion, from about 0.2% to 2.0% emulsifier by weight of the emulsion, and water to make up 100% by weight, the emulsion having a pH of about 2.7.

20. The paving slurry seal mixture of claim 12 wherein a mixture of tall oil fatty acids is added to the bitumen prior to emulsification.

21. The paving slurry seal mixture of claim 20 wherein the tall oil fatty acids mixture is tall oil pitch.

22. The paving slurry seal mixture of claim 12 or 13 wherein the inorganic additive is selected from the group consisting of portland cement, hydrated lime, limestone dust, fly ash, ammonium sulfate and aluminum sulfate.

* * * * *

UNITED STATES PATENT AND TRADEMARK OFFICE
CERTIFICATE OF CORRECTION

PATENT NO. : 4,450,011

DATED : May 22, 1984

INVENTOR(S) : Peter Schilling and Hans G. Schreuders

Page 1 of 2

It is certified that error appears in the above—identified patent and that said Letters Patent is hereby corrected as shown below:

In column 14, beginning with line 5, the columned heading

" Coating After
   Water Wash
      (min.)
 1   15   30   60"   should read --      %
                                   Coating After
                                    Water Wash
                                      (min.)
                                 1   15   30   60--.

In column 16, beginning with line 5, the columned heading

" Coating After
   Water Wash
      (min.)
 1   15   30   60"   should read --      %
                                   Coating After
                                    Water Wash
                                      (min.)
                                 1   15   30   60--.

UNITED STATES PATENT AND TRADEMARK OFFICE
CERTIFICATE OF CORRECTION

PATENT NO. : 4,450,011   Page 2 of 2
DATED : May 22, 1984
INVENTOR(S) : Peter Schilling and Hans G. Schreuders It is certified that error appears in the above—identified patent and that said Letters Patent is hereby corrected as shown below:

In column 18, beginning with line 5, the columned heading

" Coating After
   Water Wash
      (min.)
 1   15   30   60"   should read -- %
                                Coating After
                                 Water Wash
                                    (min.)
                                 1   15   30   60--.

Signed and Sealed this

*Eighteenth* Day of *December 1984*

[SEAL]

*Attest:*

*Attesting Officer*

GERALD J. MOSSINGHOFF

*Commissioner of Patents and Trademarks*